United States Patent [19]

Monteith

[11] Patent Number: 4,582,491
[45] Date of Patent: Apr. 15, 1986

[54] TRAINING APPARATUS

[75] Inventor: Wilfred D. Monteith, Fife, Scotland

[73] Assignee: Marconi Instruments Limited, England

[21] Appl. No.: 541,138

[22] PCT Filed: Feb. 7, 1983

[86] PCT No.: PCT/GB83/00033

§ 371 Date: Oct. 3, 1983

§ 102(e) Date: Oct. 3, 1983

[87] PCT Pub. No.: WO83/02843

PCT Pub. Date: Aug. 18, 1983

[30] Foreign Application Priority Data

Feb. 8, 1982 [GB] United Kingdom ............... 8203556

[51] Int. Cl.$^4$ .............................................. G09B 23/20
[52] U.S. Cl. ...................................... 434/218; 364/423
[58] Field of Search .......................... 434/218; 364/423

[56] References Cited

U.S. PATENT DOCUMENTS

| Re. 27,078 | 3/1971 | Shaw et al. | 434/218 |
|---|---|---|---|
| 3,558,865 | 1/1971 | Berndt | 434/218 |
| 3,736,411 | 5/1973 | Berndt | 434/218 |

*Primary Examiner*—Richard C. Pinkham
*Assistant Examiner*—Leo P. Picard
*Attorney, Agent, or Firm*—Kirschstein, Kirschstein, Ottinger & Israel

[57] ABSTRACT

An apparatus for training a user in contamination surveillance. The contamination may be from a nuclear, bacteriological or chemical explosion or leak, for example. The apparatus is portable and can be carried by the user to various points of an exercise area. The apparatus includes a data store and an interpolation device. The data store stores data which is derived from a mathematical model of an assumed source of contamination and which defines the contamination levels at various locations within the exercise area at respective elapsed times after the assumed commencement of contamination. The interpolation device is responsive to first signals which define the location within the exercise area and to second signals which define the elapsed time when the user of the apparatus inputs the first signals. The apparatus also may include a display on which is shown the contamination level, and a keyboard from which the first and second signals may be input. In a preferred embodiment the location is defined by entering Universal Transverse Mercator grid reference coordinates and the interpolation device is a microprocessor.

15 Claims, 7 Drawing Figures

TRAINING APPARATUS

The present invention relates to training and apparatus and in particular to such apparatus for training personnel in surveying for nuclear, bacteriological or chemical contamination.

There is a requirement for personnel to be trained in surveying large areas of terrain for nuclear fallout and/or contamination which may be airborne and/or at ground level.

Deliberately contaminating a large area for training purposes is not a practical proposition. Accordingly, methods of training have been in the past purely hypothetical or have used low level radio active sources concealed within the field of the exercise.

One more recent nuclear radiation simulator uses a frequency modulated radio signal transmitting an encoded digital data signal representing the contamination level. The coded signal was decoded by replica radiation meters all of which had the same value "measured" regardless of their respective geographical locations.

It is an object of the present invention to provide training apparatus for use in more realistic simulation exercises involving nuclear, bacteriological or chemical contamination.

The term "contamination" as used hereinafter means nuclear and/or bacteriological and/or chemical contamination.

According to the present invention in training apparatus for use in contamination surveillance training, a data store is arranged to store data derived from a mathematical model of an assumed source of contamination, said data defining contamination levels at a plurality of locations at respective elapsed times after the assumed commencement of contamination and interpolation means is responsive to input signals to said apparatus which define the present location of the apparatus and to signals which define the present time to derive from the data held in the data store a value indicative of the assumed present contamination level.

Preferably the input signals which define the location of the apparatus are from a manually operable keyboard and the apparatus may include a real time clock arranged to supply the signal which define the present time.

The interpolation means may be a microprocessor which may be programmed to derive the data to be stored from input parameter of an assumed contamination source.

One embodiment of training apparatus in accordance with the invention will now be described by way of example only with reference to the accompanying drawings of which.

Figure 1:
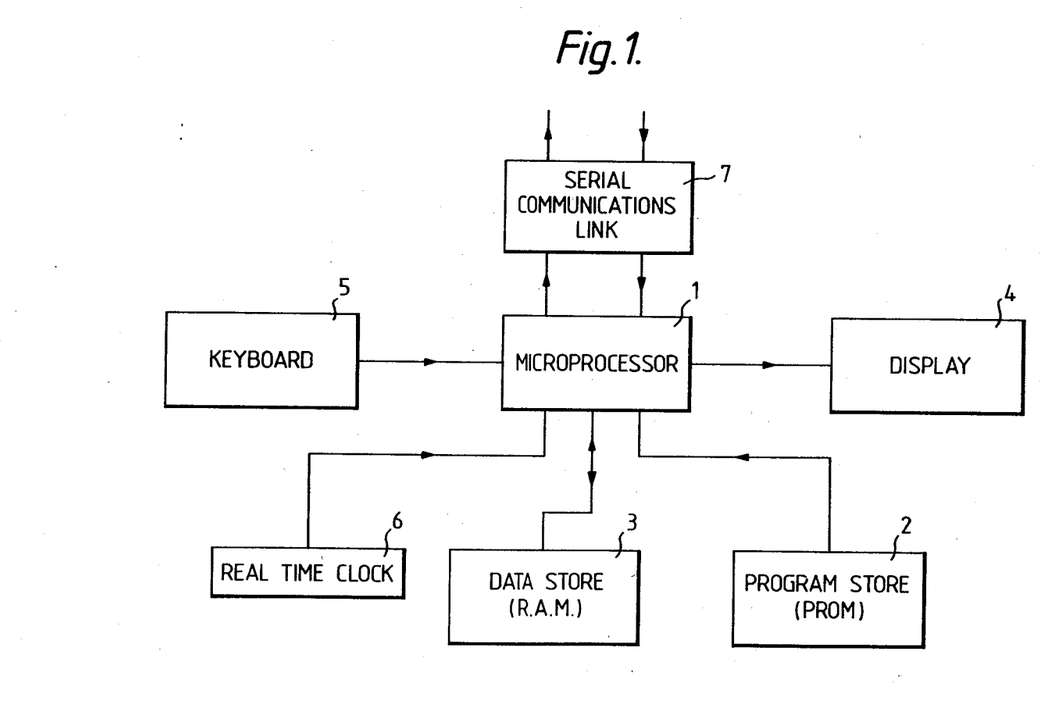
FIG. 1 is a block schematic diagram of the apparatus.

Referring to FIG. 1 the apparatus comprises a microprocessor 1 having an associated program store 2 and data store 3. The program store 2 stores a program which enables the microprocessor 1 to derive (from data held in the data store 3) an assumed contamination level for display on a display device 4 which may be a meter but is preferably an alpha numeric display.

To enable a user of the apparatus to enter a location a keyboard 5 is also provided. The keyboard 5 is also used by an instructor to enter data defining the cause of contamination and the time of its occurrence in the data store 3.

The apparatus, whilst being capable of responding to a time input from the keyboard 5 also includes a real time clock 6 which is set before commencement of an exercise by the instructor.

So that a required number of simulation meters may all receive the same data, such that in use all trainees receive compatible contamination level readings from their respective meters, the apparatus includes a serial communications link 7 which enables the simulating meters to be preprogrammed by entering data in one of them and transferring it to the rest by use of the serial communications link 7.

In order that the operation of the apparatus may be readily understood an example of the actions performed during an exercise simulating the effects of a nuclear explosion will now be given.

The mathematical model of a nuclear explosion used by the microprocessor 1 as a low altitude air blast or as a groundlevel blast is described hereinafter. The calculations require the following integers namely: the yield of the assumed bomb, the location of the blast and time of occurrence, the exercise area and the wind speed and direction at varying intervals of altitude and time. Additionally it is necessary for the real time clock 6 to be set to actual time.

Accordingly the microprocessor 1 is programmed to guide an instructor through entry of the required data. Thus referring also to FIG. 2 the user, having switched on the power and causing a built in test function (described hereinafter) to be carried out if required depresses the "EXER SET UP" key of the keyboard 5. The microprocessor now causes the display 4 to display YIELD? The user now keys in the kilotonnage of the fission products of the hypothetical burst using the keyboard 5, the value of which is displayed on the display 4 until the enter/clear key of the keyboard 4 is depressed. (It is here noted that the mathematical model described hereinafter is capable of use for training in surveyance for contamination caused by small tactical nuclear weapons ranging up to large strategic nuclear weapons.)

Figure 2:
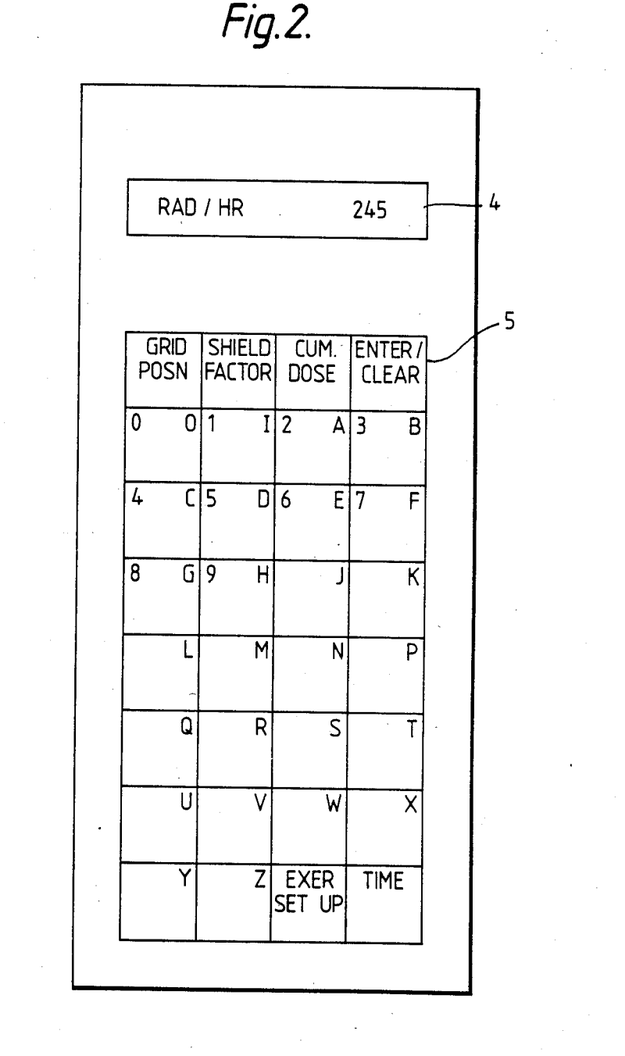
FIG. 2 shows a keyboard layout of the apparatus.

The microprocessor 1 now causes "G.Z.GRID" to be displayed which invites the user to enter the map grid reference of the location of the hypothetical burst (the "ground zero" reference). The G.Z. reference is entered by depressing the enter/clear key again at which time the display 4 is caused to display "B. D/TIM?". The planned date (day only e.g. 25 for the 25th) and time in the twenty four hour clock format (e.g. 0900 for nine a.m. and 2100 for nine p.m.) of the hypothetical burst and a letter reference for the time zone (e.g. 'z' for Greenwich Mean Time) are now keyed in. After checking, the operator again depresses the enter/clear key.

The display 4 now shows "GRID SQUARES?". This is a request for the exercise area to be defined as an area of 100 kilometer (KM) squares to a maximum of ten squares in each direction. These are keyed in in mapgrid character pairs commencing from the south-west corner of the exercise area and ensuring that the defined area includes the "ground zero" location previously referred to.

Thus keying in "AA AB AC enter" defines an exercise area extending east of the south-west corner by 300 KM. Further sets of pairs of digits are entered to define 100 KM exercise areas extending north of the south-east corner of the exercise area; (See e.g. FIG. 5)

Figure 5:
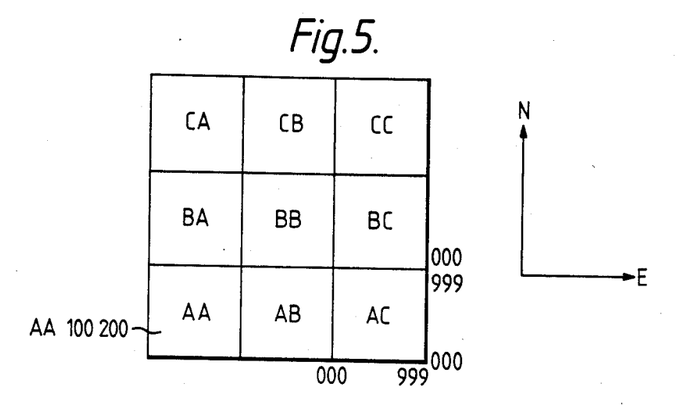
FIG. 5 is a schematic map grip pattern.

Thus keying:
"AA AB AC—enter,
BA BB BC—enter,
CA CB CC—enter".
defines a 300 KM square sided exercise area.

The microprocessor 1 having received the definition of the exercise area causes the display 4 to display "WIND LEVEL H?". The mathematical model assumes that the wind speed and direction is constant throughout the exercise area. However it is arranged to handle wind speeds and directions which vary with height in 2000 meter bands up to 30,000 meters. "Wind level H" is a request for the mean wind speed and direction in the 0-2000 meters above ground level band. This is entered as a six digit number, the first three digits representing the wind direction in degrees from North and the latter three digits being the wind speed in kilometers per hour. Thus keying in "180020 enter" would indicate a twenty kilometer per hour wind from the south in the 0-2000 meter band.

When the first band wind level has been entered the microprocessor 1 requests the wind for bands I (2000 to 4000 meter) to W (28,000 to 30,000 meters) in turn.

Having entered all of the data it is necessary for the real time clock 6 to be set. The microprocessor 1 causes the display 4 to show "SYNC D/TIM?" at which the instructor enters the current date and time in the same format as for entering the planned date and time of the hypothetical burst. The real time clock 6 commences running from the time at which the enter/clear key is depressed.

Thus for an exercise based on a fifty kiloton nuclear burst occurring close to the south-west corner of a 300 KM×300 KM exercise area at 0900 Hrs on the 25th day of the month with the simulator being programmed at 1800 Hrs on the previous day the actions are as follows:

| DISPLAY | ACTIONS |
|---|---|
| | Press EXER. SET button |
| YIELD? | Key in yield |
| YIELD 50 | ENTER/CLEAR |
| G.Z. GRID? | Key in ground zero map grid reference, |
| G.Z. AA 100200 | ENTER. |
| B. D/TIM? | Key in data/time of burst, |
| B.D/TIM25 0900Z | ENTER |
| GRID SQUARES? | Key in letter pairs for first three 100Km squares, |
| AA AB AC | ENTER |
| | Key in letter pairs for second three 100Km squares, |
| BA BB BC | ENTER |
| | Key in letter pairs for third 100Km squares, |
| CA CB CC | ENTER |
| WIND LEVEL H? | Key in wind direction/speed for level H, |
| H 160020 | ENTER |
| | Key in wind direction/speed for level I, |
| I 160020 | ENTER |
| | Key in wind direction/speed for level J, |
| J 165025 | ENTER |
| | Key in wind direction/speed for level K, |
| K 165025 | ENTER |
| L . . . | . . . |
| | . . . |
| | up to level W |
| SYNC D/TIM? | Key in present date/time to next minute |

-continued

| DISPLAY | ACTIONS |
|---|---|
| D/TIM 24 1800Z | When operators watch reaches the entered time press ENTER |
| EXER. SET ENDS | |

The "EXER SET ENDS" message is displayed for five seconds after which the simulator is ready for use.

Pressing the "EXER SET UP" key again enables the operator to check the data which has been entered simply by depressing the enter/clear key in respect of each line. The microprocessor 1 causes the previously entered data to be displayed by the display 4 which may be amended by the operator if necessary by keying in the correct data.

The mathematical model of a nuclear explosion occurring at a burst time ("H") which is held in program store 2 operates in the microprocessor 1 in the following manner.

A general cloud model composed of discrete elements spaced vertically in the "mushroom cloud" of the burst is assumed. Each element is assumed to fall from its starting height through the various wind levels until it reaches the ground. Each element is assumed to have a given vertical velocity such that if the wind speed were twenty-four kilometers per hour the element is assumed to have fallen at the correct down-wind distance from ground zero. Variations of the wind speed from twenty-four kilometers/hour entered are taken into account by generating a synthetic wind speed as hereinafter described.

All simulations and calculations are based on the Universal Transverse Mercator (UTM) Map Grid system (although it will be appreciated that any Map Grid system could be employed) and calculations are carried out to an accuracy of 100 meters (1/10 KM).

In the map grid system two digits designate a unique grid square of 100 KM by 100 KM. The following three digits are eastings and the last three digits are northings. Thus referring to FIG. 5 a grid reference of AA 000 000 is the south-west corner of the exercise area previously specified, whilst the ground zero location of the burst AA 100 200 is ten kilometers east and twenty kilometers north of the south-west corner of the exercise area.

The microprocessor 1 is programmed to calculate a synthetic wind speed for each 2000 meter band. As has been previously mentioned the fallout vertical velocity algarithm has been corrected for a windspeed of twenty-four KM/Hr. Wind speeds of less than twenty-four KM/Hr give a synthetic wind speed of twelve plus (0.5×entered wind speed) whilst wind speeds in excess of twenty-four KM/Hr give a synthetic wind speed of eighteen plus (0.25×entered wind speed).

The wind direction and strength is resolved into Easterly and Northerly components, with these components having positive values. It will be appreciated that winds having a westerly component will give a negative easterly value and similarly winds having a southerly component will have a negative northerly value. The easterly and northerly components are derived by multiplying synthetic wind strength by the sine and cosine respectively of the wind direction.

Figure 3:
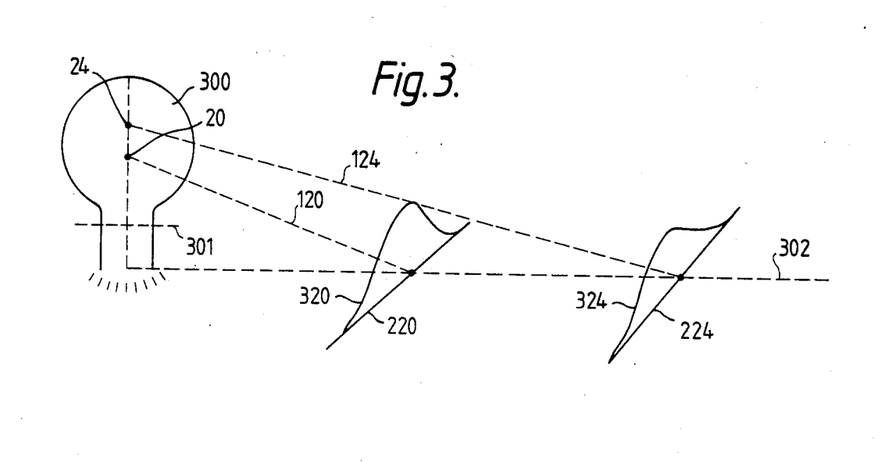
FIGS. 3, 4 and 6 are fallout plans used in the description of an algorithm used by the apparatus.

Referring now to FIG. 3 the fall of each of the forty elements of the cloud 300 are considered. The first of the forty elements (referred to as element O) is considered to be at two-thirds of the stem height of the cloud as indicated by the chain dash line 301 whilst the last of the elements (element 39) is at the top of the cloud arising from the burst. Each element is given a predetermined rate of fall with element 'O' having the highest rate and element 39 the lowest rate.

As each element falls toward ground level its direction and lateral displacement is processed by application of the wind components in respect of each of the bands through which it falls. The path 302 of the forty elements on reaching ground level is thus determined. It is here noted that the path 302 may be curved.

As the data is calculated for each of the forty elements a ground position and time of arrival is determined together with the peak intensity of radiation at that point and the width of a line extending at right angles either side of the path 302 on which the radiation calculation (appropriately scaled from the peak intensity) for the particular element is effective.

Consider element 20 and element 24 of the cloud 300, each has a respective path of fall 120.124 and on arrival at ground level gives a respective lateral width slice 220, 224 having a peak intensity immediately above the line of fall which reduces in a sinusoidal manner towards the ends of the slices as indicated by intensity profiles 320,324.

The vertical velocity of each element of the cloud is used to calculate the time of arrival of each element at ground level and each element is allocated a duration of arrival, that is a period of time over which the radiation attributable to the slice will arrive and which is calculated as being 0.75 of the period between the burst time $\underline{H}$ and the time of arrival.

It is here noted that the cloud is assumed to stabilise at H+ten minutes at a height dependent on the kilotonnage (W) of the bomb. The peak intensity of each element is stored as the intensity at H+one hour ("H+1" time).

Thus the data calculated and stored in respect of the numbered elements is given in the following table:

a map grip position (of his location) and, if necessary a shielding factor by way of the keyboard 5.

The shielding factor is a measure of the protection given by material surrounding the user, typical factors being ten to twenty for tanks, two to four for armoured personnel carrier and one to two for other skinned vehicles. If no shielding factor is entered then the shielding factor is assumed to be one. The microprocessor is programmed to calculate the radiation (rads/hr) and to divide the figure by the shielding factor (if any).

The calculated figure is displayed on the display 4 except when the 'CUM.DOSE' key of the keyboard 5 is depressed when the accumulated (time integrals) dose received by the user of the meter since the burst time (H) is displayed.

It is here noted that dosages in excess of 3,000 rads/hr are displayed solely as "over 3000" although the microprocessor 1 is programmed to handle higher doseage rates and could be arranged to display the higher (actual) figures.

Athough the orientation of the slices for which calculations have been made will vary on a curved fallout path, all calculations are based on the orientation of the central slice (that resulting from the twentieth element of the cloud).

When a map grid reference is entered from the keyboard 5 the microprocessor 1 generates the parameters of an artificial slice which passes through the point specified (the survey point) from the previously calculated and stored parameters of the ones of the forty slices which encompass the survey point. For this purpose it is necessary to identify the pairs of slices which encompass the survey point, Thus, referring to FIG. 6 and assuming a slice orientation of $\phi$ degrees a calculation is carried out in respect of each of the forty slices and the artificial slice to project same to a point on a base line having a north axis. (However if $\phi$ is close to zero the projection may

| No | Start Height (KM) | Vertical Velocity KM/HR | Peak Intensity Rad/Hr I | Max Width KM | Time of Arrival (T) | Duration of Arrival Hrs (D) | Position of Arrival |
|---|---|---|---|---|---|---|---|
| 0 | ⅔ stem | | | $0.4 \times 5.31W^{0.48}$ | | | |
| 5 | | $15.63 + \text{Log W}$ | 3000 | $0.6 \times 5.21W^{0.48}$ | | | |
| 10 | ⅔ stem | $9.86 + \text{Log W}$ | 1000 | $0.8 \times 5.31W^{0.48}$ | | | |
| 15 | $+ \text{No}/40$ | $4.56 + \text{Log W}$ | 300 | $5.31W^{0.48}$ | Start Height | 0.75 $\times$ | Calculated as |
| 20 | Of (⅔ | $2.63 + \text{Log W}$ | 100 | $5.31W^{0.48}$ | + Vertical | Time of | Hereinbefore described |
| 25 | stem to | $1.645 + \text{Log W}$ | 30 | $5.31W^{0.48}$ | Velocity | Arrival | |
| 30 | Cloud top | $1.218 + \text{Log W}$ | 10 | $5.31W^{0.48}$ | | | |
| 35 | distance) | $1.065 + \text{Log W}$ | 3 | $0.7 \times 5.31W^{0.48}$ | | | |
| 39 | | $.871 + \text{Log W}$ | 1 | $0.2 \times 5.31W^{0.48}$ | | | |

Having calculated and stored data in respect of all forty elements, which calculations may be carried out by the microprocessor prior to commencement of the exercise, the microprocessor 1 is ready to calculate the intensity (rads/Hr) at any map grid position within the exercise area at any time.

Figure 6:
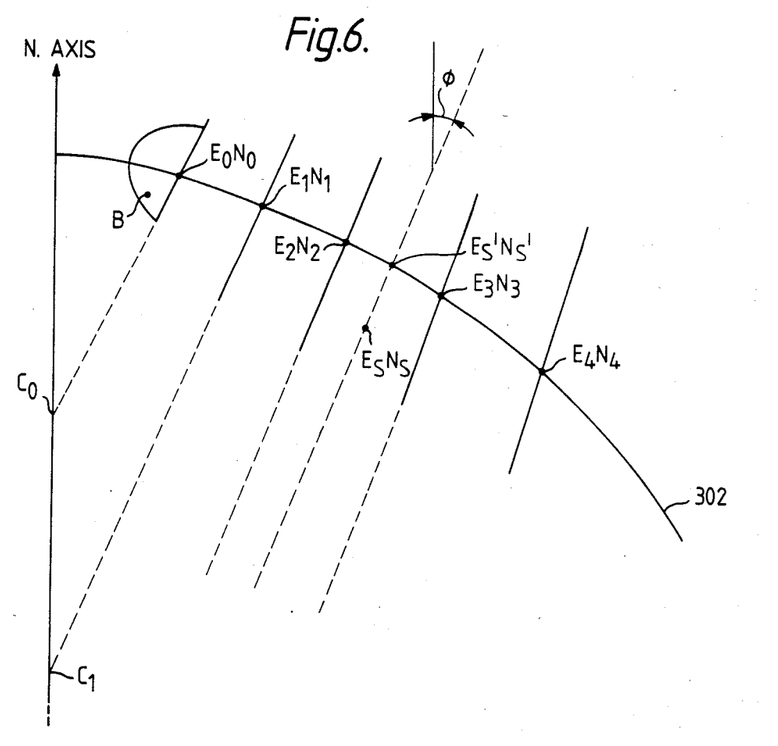

The exercise may be carried out in either one of two modes. The principal mode of operation relies on the real time clock 6, the user of the apparatus entering only be done to a base line having an east axis.) Since all slice orientations are the same the equation of the extended slice intercept Cx on the north axis is given by $Cx = Nx - Cot \, \phi \, Ex.$ Cx is evaluated for each of the slices giving $C_1$ to $C_{40}$ for the forty original elements of the cloud and $C_2$ for the survey point $E_sN_s$. A check is then carried out to determine between which (if any) pairs of slices the survey point lies.

Figure 4A:
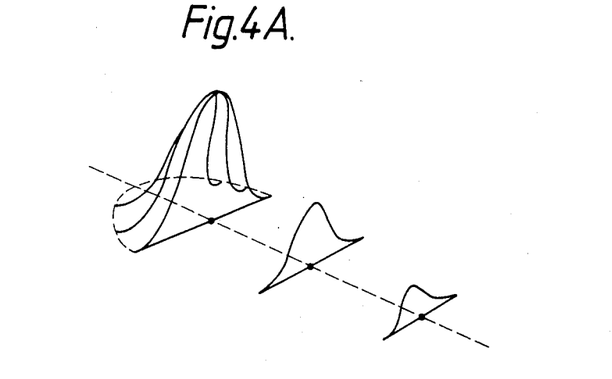
Figure 4B:
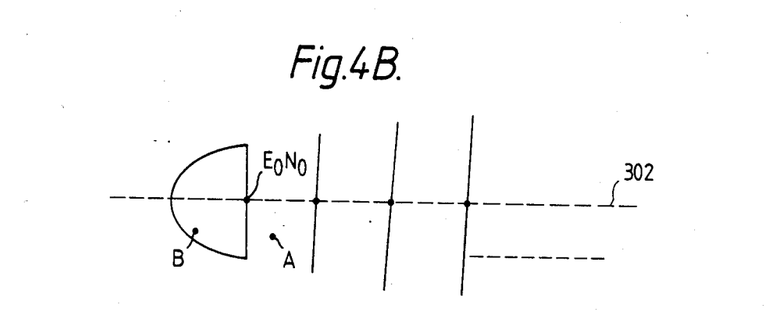

It is here noted that if $C_s$ is on the opposed side of $C_0$ to $C_1$ it is necessary to consider a three dimensional extrapolation of slice zero as shown in FIGS. 4A and 4B. However as shown in FIG. 5 the survey point EsNs lies between slice two and slice three for which parameters are stored in the data store 3.

Having determined that the survey point lies between slices two and three it is necessary to use the parameters of these two slices to generate the parameters of the artificial slice.

Thus the proportional position of the point $E_s'$ $N_s'$ is evaluated as follows:

The equation of the line joining $E_2N_2$ to $E_3N_3$ is given by $$\frac{N - N_3}{E - E_3} = \frac{N_3 - N_2}{E_3 - E_2}$$

Therefore

Therefore $N = \left(\frac{N_3 - N_2}{E_3 - E_2}\right) E - \left(\frac{N_3 - N_2}{E_3 - E_2}\right) E_3 + N_3$ The line through the survey point is given by $$N = C_o + E \cot \phi$$

Solving these equations simultaneously gives the co-ordinates of the crossing point $E_s'$ $N_s'$.

The longitudinal position ratio of $E_s'$ $N_s'$ on the line $E_2 N_2$ to $E_3 N_3$ is now determined from $$\frac{E_s' - E_2}{E_3 - E_2} \text{ or } \frac{N_s' - N_2}{N_3 - N_2}$$

to give a ratio figure R of the distance between the slices two and three at which the artificial slice lies.

The width(S) of the artificial slice may now be found from the width ($S_2$) of slice two and the width ($S_3$) of slice three and is given by $$S = S_1 + R(S_2 - S_1).$$

The microprocessor 1 determines the distance ($\rho$) of $E_s$. $N_s$ from $E_s'$ $N_s'$ from $$\rho = \sqrt{(E_s - E_s')^2 + (N_s - N_s')^2}$$

and determines the ratio ($\rho/S$)

Since the width of the artificial slice is assumed to be symetrical about $E_s'$ $N_s'$ it will be appreciated that if ($\rho/S$) is greater than 0.5 the survey point is outside the contour of the assumed radiation and has a zero radiation intensity. In such circumstances, further consideration by the microprocessor is not required.

If the survey point is within the contamination area then the final peak intensity (Is) is calculated from the peak intensity of the two adjacent slices.

Thus $$I_s = I_2 + R(I_3 - I_2).$$

The time of arrival is similarly found from $$T_s = T_2 + R(T_3 - T_2)$$

and the duration of accumulation may be found either from $0.75 \times T_s$ of from $$D_s = D_2 + R(D_3 - D_2).$$

Ts is now compared with the time in the real time clock 6 to determine whether irradiation has commenced. If not then again zero is displayed on the display 4.

Provided that the real time is later than Ts, the microprocessor 1 is programmed to determine the final intensity ($i_s$) of the radiation at the survey point from the final peak intensity (Is) of the artificial slice from $$i_s = I_s \left[ 0.5 + 0.5 \sin\left(\frac{\pi}{2} + \frac{2\pi\rho}{S}\right) \begin{matrix} \lim \frac{l}{s} = 0.5 \\ \lim \frac{l}{s} = 0 \end{matrix} \right]$$

Thus the following parameters of the artificial slice have been found:
  the time of interrogation (t) (from the real time clock),
  the final intensity ($i_s$) at the survey point,
  the time of arrival (Ts) of the initial fallout,
  the duration of arrival (Ds) of the fallout and the shielding factor (if any) from the keyboard.

To determine the radiation intensity to be displayed the microprocessor examines t to determine whether it is after Ts+Ds. If so further calculation is based on $i_s$. If t lies between Ts and Ts+Ds then an accumulation ratio factor (t−Ts/Ds) is used to determine from $i_s$ the intensity value on which the final calculation is based. It will be realised that the accumulation ratio factor will change from zero at Ts to 1.0 at Ts+Ds.

It will be remembered that the intensity values have been normalised for radioactivity back to one hour after the burst time ("H+1"). Since the radiation intensity decays with time, $i_s$ must be multiplied by a decay factor. The microprocessor 1 therefore decays $i_s$ according to $t^{-1.2}$ (assuming t is after H+1).

The figure is displayed in rads/hr on the display. Periodically, say, every two minutes, the microprocessor 1 recalculates the radiation intensity taking account of time variations and any newly entered grid references and causes a new value to be displayed such that over a period of time the display 4 reflects the reduction (or increase) in intensity which would occur in reality.

It is noted that if a shielding factor is entered it is also taken into account prior to display.

The program is also arranged to integrate the doseage in real time so that the cumulative dose may be displayed on demand.

Referring to FIG. 4B if the calculation of Cs as hereinbefore described indicates that the survey point is on the opposed side of Co to $C_1$, such as is shown by the survey point B it is necessary to determine only the distance of B from Eo No and to apply this as '$\rho$' on slice 'O' in the algorithm described.

In the immediate vicinity of ground zero, neutron induced gamma activity (NIA) must also be taken into account by the program. The effect of NIA beyond a distance of, say, five kilometers from ground zero is ignored. Otherwise the distance (S) of the survey point from ground zero is calculated and the H+1 intensity (I) attributed to NIA is calculated from $$\log_{10}\frac{I}{9.1W} = -2.2564S + 0.6021.$$

A look up table is provided in the store 2 from which a multiplication factor for NIA dependent on the time after 'H' is recovered by the program and applied to the NIA "H+1" intensity.

Although the factor is dependent on soil composition a typical table is

| t (Hours after burst) | 0.1 | 0.2 | 0.3 | 0.4 | 0.5 | 0.6 | 0.7 | 1.0 | 2 | 5 | 10 | 20 | 50 |
|---|---|---|---|---|---|---|---|---|---|---|---|---|---|
| Factor | 30 | 6 | 2.5 | 1.3 | 1.2 | 1.1 | 1.05 | 1.0 | .85 | .65 | .42 | .23 | .06 |

The NIA intensity is added to the fallout radiation intensity before display.

For realism the algorithm may be arranged to introduce pseudo-random 'hot spots' of radiation intensity within the exercise area.

If the fallout path to be assumed is exceedingly curved it is possible for the survey point to be encompassed by more than one pair of slices. In this case the calculations described above will be carried out in respect of each of the pairs and their radiation intensity effect at the survey point will be added together prior to display of the intensity figure.

Referring again to FIG. 1, in order to facilitate programming of a large number of simulated survey meters, the apparatus is provided with a serial communications link 7. A number of meters may be linked together in serial fashion and the input data having been entered in a first one may be copied under control of the microprocessor 1 into each of the others.

For classroom use the second mode of operation which is provided is one in which the time of survey is entered from the keyboard 5 rather than being derived from the real time clock 6. Thus an exercise which could last several days may be carried out in a few hours if desired.

It is emphasised that all meters set up for a particular exercise are arranged to give consistant results.

It will be realised that the calculation of the parameters of the forty slices could be carried out in a central computer and the data transferred to the apparatus thus reducing the program required by the microprocessor 1.

In an alternative embodiment each of the survey apparatuses incorporates a radio receiver and the results of the contamination calculations and updates are broadcast in a serial data stream using a standard FM digital transmitter including radio relay stations if necessary. In this case the microprocessor selects from the digital data stream the data which is correct for display at the keyed in grid reference.

It will be appreciated that additional bursts and changes in wind speed and direction may be added during the course of an exercise. In this case the effect of each burst on a particular survey point is determined and the values added together for display.

It will be appreciated that the map grid positions could also be determined by use of multiple radio beacons in the exercise area the signals from which could be used in the apparatus to derive the location of the apparatus. In an alternative mode of operation position signals may be received from an aircraft navigation system. For classroom use, such as in training control centre personnel in plotting and prediction techniques, the time (t) may be entered from the keyboard 5 and the map grid position entered as before. The microprocessor 1 carries out the calculation in the manner hereinbefore described but substitutes the entered time for the real time throughout the algorithm.

The following commercially available devices have been found suitable and may be used for implementation of the invention: The microprocessor 1, Intel 80C51/31, the data store 3 (RAM); "Hitachi" 62641P, the program store 2 (Ultra Violet Eraseable PROM); MBM 27C64 and the real time clock: National Semiconductor MM 58174.

The keyboard 5 may be implemented by use of two four by four keyboards suitably mounted one such commercially available keyboard being manufactured by Sadar (of France) under part no. CCX 44MCN3. The display 4 may be of the kind known as a "Liquid Crystal Diode" display one example of which is available from PCI (Europe) Limited of England under part number PC1M200-M.

I claim:

1. Apparatus for use in contamination surveillance training, said apparatus being portable by a person to various parts of an exercise area,
    said apparatus including
    (1) data store means arranged to store data derived from a mathematical model of an assumed source of contamination that has been preprogrammed into said data store means, said assumed source of contamination being disposed at a location which has been preprogrammed into said data store means, said assumed source of contamination being under an assumed set of conditions which has been preprogrammed into said data store means, said data defining contamination levels at a plurality of locations within said exercise area identifiable by coordinates spaced from the assumed location of the assumed source of contamination at respective elapsed times after the assumed commencement of contamination,
    (2) manually operable means for generating first input signals representing the coordinates of a said spaced location in said exercise area into which the apparatus has been carried,
    (3) means for generating second input signals representing a said elapsed time,
    (4) interpolation means responsive to said first and second input signals to derive from the data held in the data store means a value indicative of the assumed contamination level at the said location at the said elapsed time, and
    (5) display means for displaying said values.

2. Training apparatus as claimed in claim 1, wherein the means for generating said first input signals is a manually operable keyboard.

3. Training apparatus as claimed in claim 2, wherein the means for generating said second input signals is a manually operable keyboard.

4. Training apparatus as claimed in claim 1, wherein the means for generating the second input signals is a real time clock.

5. Training apparatus as claimed in claim 1, in which said interpolation means is a microprocessor.

6. Training apparatus as claimed in claim 1, in which said interpolation means is arranged to accumulate a value indicative of the total contamination dosage assumed to have been received by the user of the apparatus over a period of time.

7. Training apparatus as claimed in claim 1, including input/output means such that a plurality of such apparatuses may be interconnected to permit the transfer of data between them.

8. Training apparatus as claimed in claim 1, in which said interpolation means is arranged to accumulate a value indicative of the total contamination dosage assumed to have been received by the user of the apparatus over a period of time.

9. Training apparatus as claimed in claim 1, incorporated in a portable simulation meter.

10. Training apparatus as claimed in claim 1, wherein the stored data is derived from input parameters associated with the assumed contamination source comprising the magnitude of the assumed contamination source, the height of the assumed contamination source with respect to ground, the location of the assumed contamination source, the nature of the assumed contamination source, and an assumed wind direction.

11. Training apparatus as claimed in claim 10, in which the input parameters are used to derive a respective plurality of parameters for each of a plurality of linear slices of the exercise area and in which corresponding parameters for a specified survey point are derived by interpolation of the respective parameters of at least one pair of said plurality of linear slices which encompass said survey point.

12. Training apparatus as claimed in claim 11, in which said plurality of parameters in respect of each of said linear slices define the centre of location of arrival and width of the slice, the starting time of the assumed source of contamination, the contamination intensity of the centre of the slice extrapolated to a particular time and the period of time after said starting time for the contamination to reach such contamination intensity.

13. Training apparatus according to claim 12, in which the contamination intensity at a survey point is interpolated from the contamination intensity parameter by application of a time related decay factor.

14. Training apparatus according to claim 13, in which the contamination intensity at a survey point is interpolated from the contamination intensity parameter in dependence upon the distance of the survey point from the centre of location parameter.

15. Training apparatus according to claim 12, in which the contamination intensity at a survey point is interpolated from the contamination intensity parameter in dependence upon the distance of the survey point from the centre of location parameter.

* * * * *